United States Patent
Yamaguchi

(10) Patent No.: US 10,027,830 B2
(45) Date of Patent: Jul. 17, 2018

(54) IMAGE FORMING APPARATUS

(71) Applicant: Brother Kogyo Kabushiki Kaisha, Nagoya-shi, Aichi-ken (JP)

(72) Inventor: Takuya Yamaguchi, Toyokawa (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 15/459,064

(22) Filed: Mar. 15, 2017

(65) Prior Publication Data
US 2017/0272595 A1   Sep. 21, 2017

(30) Foreign Application Priority Data

Mar. 15, 2016 (JP) ................. 2016-051213

(51) Int. Cl.
- *H04N 1/04* (2006.01)
- *H04N 1/00* (2006.01)
- *H04N 1/10* (2006.01)

(52) U.S. Cl.
CPC ..... *H04N 1/00554* (2013.01); *H04N 1/00588* (2013.01); *H04N 1/00631* (2013.01); (Continued)

(58) Field of Classification Search
CPC ............. H04N 1/00602; H04N 1/0057; H04N 1/00631; H04N 1/121; H04N 1/1215; H04N 2201/0081; G06K 15/16
USPC ..... 358/474, 498, 497, 401, 496, 1.12, 1.13, 358/406, 449, 463, 464; 271/3.14, 9.11, 271/4.1, 3.01, 10.02, 125, 162, 186, 225, 271/264, 314, 3.2, 4.02, 109, 10.01, 271/10.03, 117, 122, 124, 145, 273, 298, 271/301, 3.11, 3.15, 3.18, 69; 399/367, 399/380, 107, 405, 125, 361

See application file for complete search history.

(56) References Cited

U.S. PATENT DOCUMENTS 5,259,544 A * 11/1993 Hashimoto ............. B65H 5/06
                                                                226/24
5,881,351 A     3/1999 Shimotoso et al.
(Continued)

FOREIGN PATENT DOCUMENTS

JP    H04-109747 A    4/1992
JP    H06-003876 A    1/1994
(Continued)

*Primary Examiner* — Negussie Worku
(74) *Attorney, Agent, or Firm* — Banner & Witcoff, Ltd.

(57) ABSTRACT

An image forming apparatus includes an apparatus body including a housing cover, a printer, a discharge roller, a discharge portion, a scanner, and a document cover. The discharge portion is recessed downward in a vertical direction relative to an upper surface of the housing cover and includes a first wall and a second wall, and a receiving surface situated therebetween. The scanner is disposed downstream from the discharge portion in a sheet discharge direction, and includes a document table and an image sensor. The document cover is configured to pivot between a first position at which the document cover covers the document table of the scanner from above and a second position that is different from the first position. When the document cover is located at the first position, an upper surface of the document cover is substantially level with a downstream end of the receiving surface.

15 Claims, 9 Drawing Sheets

(52) U.S. Cl.
CPC ... *H04N 1/1061* (2013.01); *H04N 2201/0081* (2013.01); *H04N 2201/0082* (2013.01); *H04N 2201/0094* (2013.01)

(56) References Cited

U.S. PATENT DOCUMENTS

| | | | |
|---|---|---|---|
| 6,385,433 | B1 | 5/2002 | Sawada |
| 7,496,315 | B2 | 2/2009 | Mase |
| 2005/0231772 | A1 | 10/2005 | Kitaoka et al. |
| 2006/0285901 | A1 | 12/2006 | Ootsuka et al. |
| 2007/0122187 | A1 | 5/2007 | Mase |
| 2008/0291501 | A1* | 11/2008 | Shiraki ............ H04N 1/00522 358/401 |
| 2009/0109504 | A1* | 4/2009 | Hirokawa .......... H04N 1/00519 358/498 |
| 2013/0164025 | A1* | 6/2013 | Mori ................ G03G 21/1633 399/107 |
| 2014/0111590 | A1* | 4/2014 | Terada ................ B41J 3/4071 347/104 |
| 2014/0368848 | A1* | 12/2014 | Takata ................ B65H 29/60 358/1.12 |
| 2015/0158306 | A1* | 6/2015 | Nishikawa ............ B41J 29/13 347/86 |
| 2015/0189111 | A1* | 7/2015 | Otsuki ............... H04N 1/00575 358/1.12 |
| 2015/0249762 | A1* | 9/2015 | Ishida ............... H04N 1/00713 358/497 |
| 2015/0274469 | A1* | 10/2015 | Mori ................... B65H 15/00 271/291 |
| 2015/0346677 | A1* | 12/2015 | Aoi .................... G03G 15/6552 399/107 |
| 2016/0269579 | A1* | 9/2016 | Miwa ..................... H04N 1/00 |
| 2016/0347093 | A1* | 12/2016 | Ogasawara .......... B41J 11/0085 |
| 2017/0223203 | A1* | 8/2017 | Miwa .................... G06F 3/0233 |
| 2017/0248910 | A1* | 8/2017 | Hayakawa ......... G03G 15/0863 |

FOREIGN PATENT DOCUMENTS

| | | |
|---|---|---|
| JP | H09-185202 A | 7/1997 |
| JP | H09-230653 A | 9/1997 |
| JP | H09-304986 A | 11/1997 |
| JP | 2001-109210 A | 4/2001 |
| JP | 2001-139208 A | 5/2001 |
| JP | 2002-111935 A | 4/2002 |
| JP | 2003-101704 A | 4/2003 |
| JP | 2003-122062 A | 4/2003 |
| JP | 2005-309014 A | 11/2005 |
| JP | 2007-034271 A | 2/2007 |
| JP | 2007-155793 A | 6/2007 |

* cited by examiner

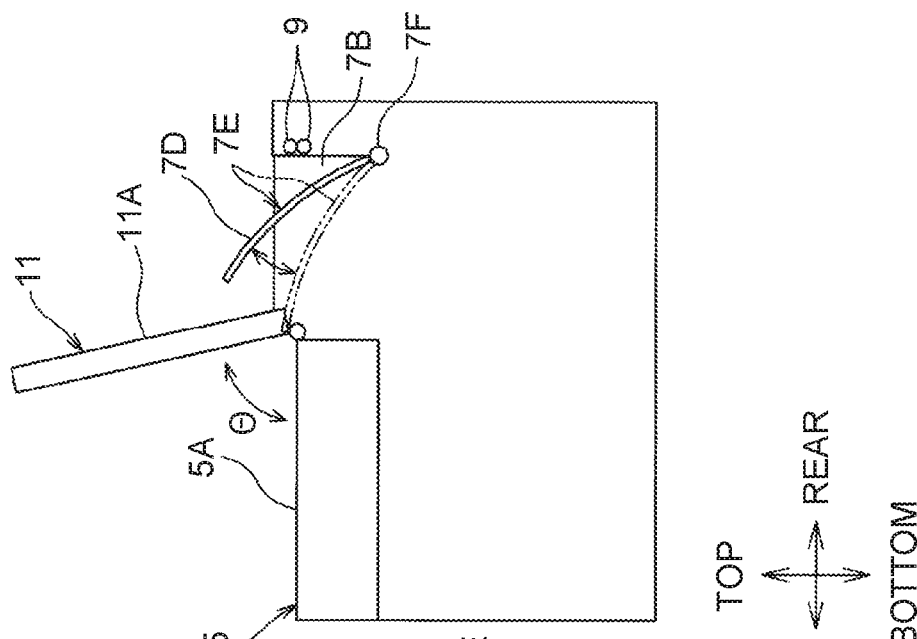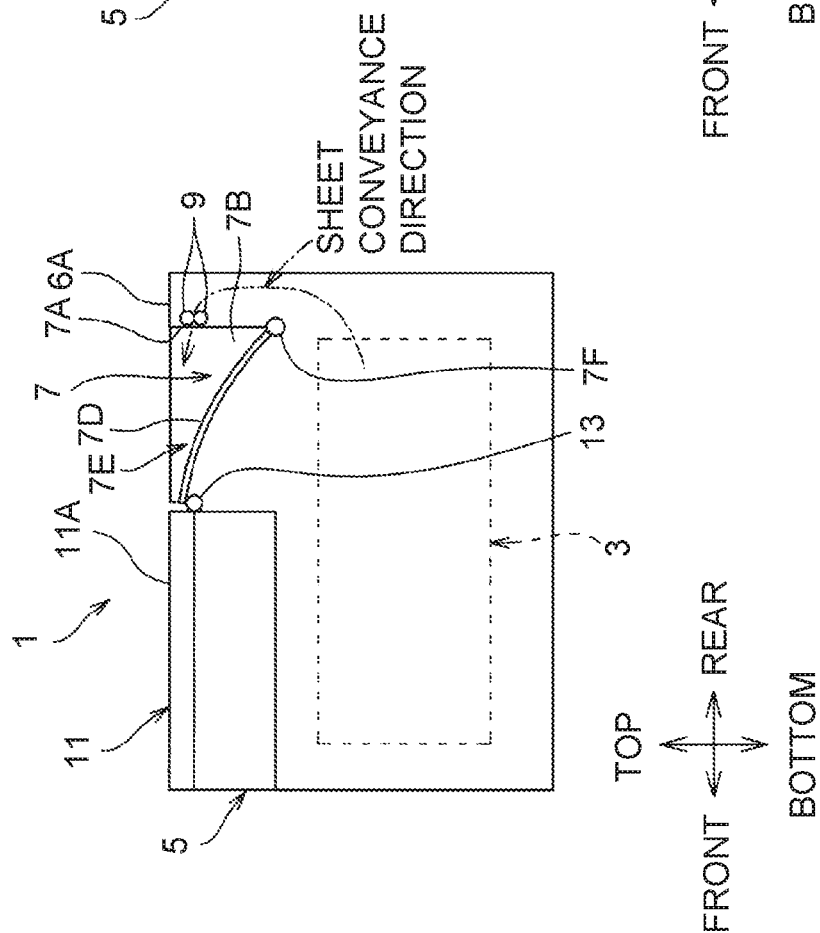

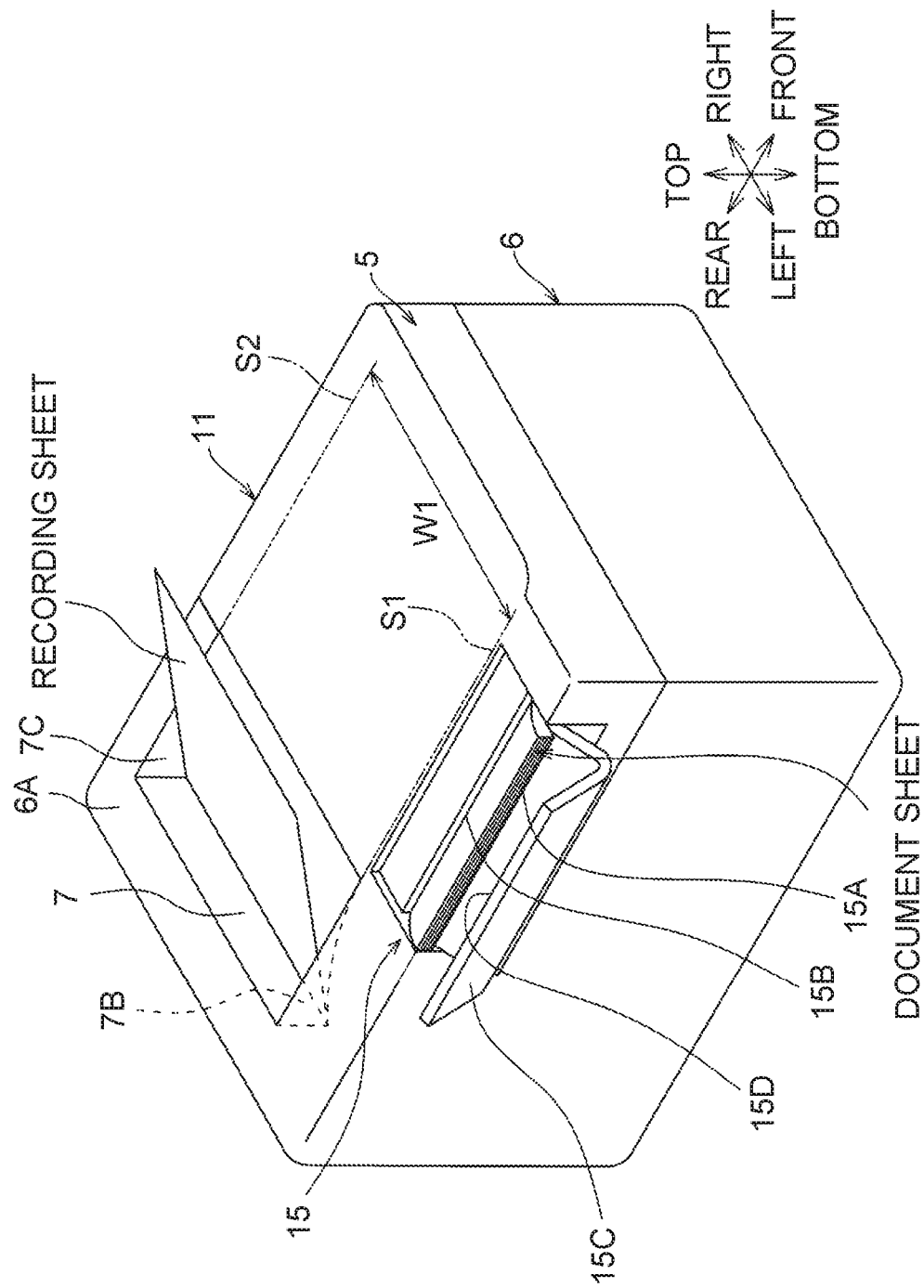

IMAGE FORMING APPARATUS

CROSS-REFERENCE TO RELATED APPLICATION

This application claims priority from Japanese Patent Application No. 2016-051213 filed on Mar. 15, 2016, the content of which is incorporated herein by reference in its entirety.

FIELD OF DISCLOSURE

Aspects disclosed herein relates to an image forming apparatus including a printer and a scanner.

BACKGROUND

A known image forming apparatus includes, for example, a printer and a scanner. The scanner is disposed vertically above the printer and is configured to scan a stationary document. The scanner includes a document cover having an upper surface in the vertical direction. In the image forming apparatus, a recording sheet on which an image has been formed is discharged onto the upper surface of the document cover.

SUMMARY

In the known image forming apparatus, the document cover may be pivotably attached to an apparatus body of the image forming apparatus. If a user pivots the document cover upward while one or more discharged recording sheets remain on the upper surface of the document cover, the one or more recording sheets may fall from or slip off the image forming apparatus.

Accordingly, some embodiments of the disclosure provide for an image forming apparatus that discharges one or more recording sheets onto a document cover, wherein if the document cover is pivoted with supporting the one or more discharged recording sheets thereon, the image forming apparatus may minimize or reduce falling of the one or more discharged recording sheets from the document cover.

According to an aspect of the disclosure, an image forming apparatus includes an apparatus body including a housing cover constituting exterior surfaces, a printer enclosed with the housing cover and configured to form an image onto a recording sheet, a discharge roller configured to discharge, in a sheet discharge direction, the recording sheet on which an image has been formed, a discharge portion recessed downward in a vertical direction relative to an upper surface of the housing cover, a scanner disposed downstream from the discharge portion in the sheet discharge direction, a document cover. The discharge portion includes a first wall and a second wall spaced from each other in a width direction orthogonal to both the sheet discharge direction and a sheet thickness direction, and a receiving surface situated between the first wall and the second wall, the receiving surface being configured to receive the recording sheet discharged by the discharge roller. The receiving surface has an upstream end and a downstream end in the sheet discharge direction. The scanner includes a document table and an image sensor. The document cover is disposed downstream from the first wall and the second wall of the discharge portion in the sheet discharge direction. The document cover is configured to pivot between a first position at which the document cover covers the document table of the scanner from above in the vertical direction and a second position that is different from the first position. When the document cover is located at the first position, an upper surface of the document cover is substantially level with the downstream end of the receiving surface of the discharge portion in the vertical direction.

With this configuration, when a discharged recording sheet is received by the discharge portion, an upstream end portion of the recording sheet may enter the recess and stay deep in the discharge portion. Therefore, if the document cover is pivoted upward by a user while the discharged recording sheet remains on the document cover, the upstream end portion of the recording sheet in the discharge direction may be supported by the first and second walls with staying deep in the discharge portion. This configuration may therefore minimize or reduce falling or slipping of the recording sheet from the image forming apparatus.

BRIEF DESCRIPTION OF THE DRAWINGS

Aspects of the disclosure are illustrated by way of example and not by limitation in the accompanying figures in which like reference characters indicate similar elements.

FIG. 4A is a sectional view of the image forming apparatus in the first illustrative embodiment according to one or more aspects of the disclosure, wherein the document cover is located at a first position. FIG. 4B is a sectional view of the image forming apparatus in the first illustrative embodiment according to one or more aspects of the disclosure, wherein the document cover is located at a second position.

FIG. 7 is a perspective view of an external appearance of an image forming apparatus in a third illustrative embodiment according to one or more aspects of the disclosure.

DETAILED DESCRIPTION

Figure 1:
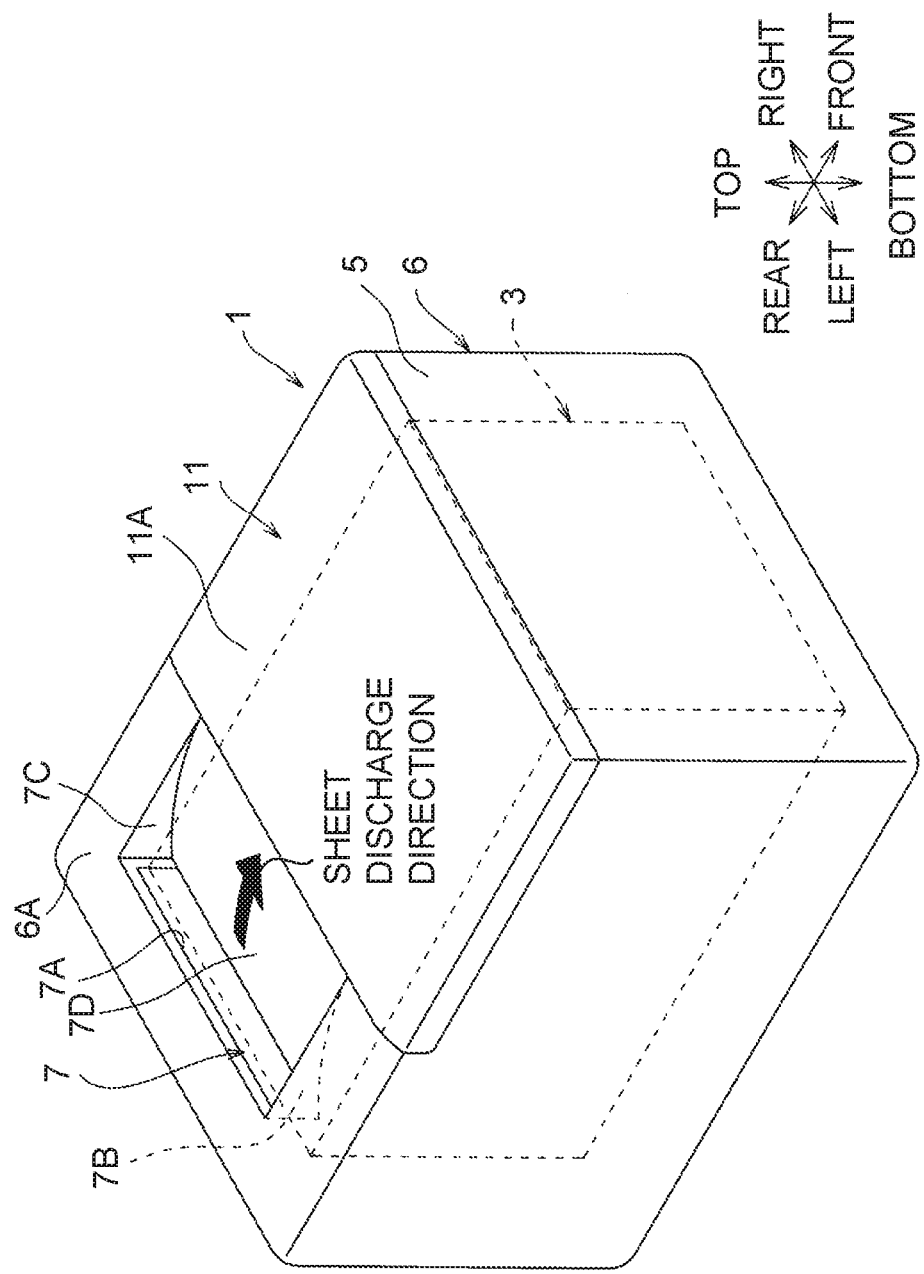
FIG. 1 is a perspective view of an external appearance of an image forming apparatus in a first illustrative embodiment according to one or more aspects of the disclosure.

The illustrative embodiments described below are merely examples. Various changes, arrangements and modifications may be applied therein without departing from the spirit and scope of the disclosure.

Hereinafter, the illustrative embodiments of the disclosure will be described with reference to the accompanying drawings. Direction arrows indicated in the drawings may help easier understanding of relative relationship between the drawings. Therefore, the directions are not limited to the specific directions indicated in the drawings.

As used throughout this disclosure, the singular forms "a", "an", and "the" may be intended to include the plural forms as well, unless the context clearly indicates otherwise. Thus, for example, a reference to "a component" includes at least one such component.

First Illustrative Embodiment

1. Configuration of Image Forming Apparatus

In a first illustrative embodiment, the disclosure may be applied to an image forming apparatus including a flatbed scanner and an electrophotographic printer.

Figure 2:
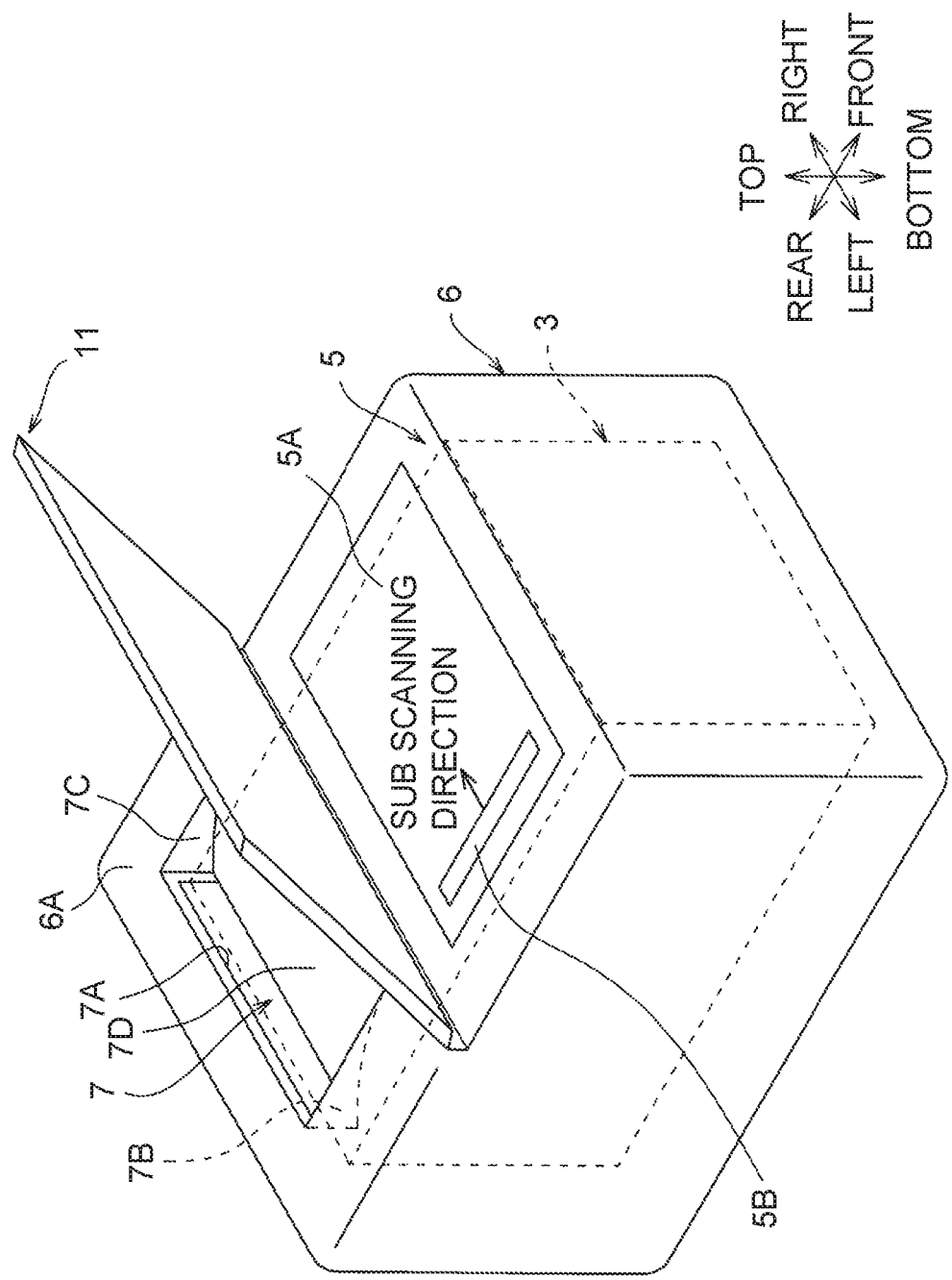
FIG. 2 is a perspective view of the external appearance of the image forming apparatus in the first illustrative embodiment according to one or more aspects of the disclosure, wherein a document cover is opened.

As illustrated in FIGS. 1 and 2, the image forming apparatus 1 includes a printer 3 and a scanner 5. The printer 3 is an image forming mechanism configured to form an image onto a recording sheet. The printer 3 is enclosed with a housing cover 6. The housing cover 6 constitutes exterior surfaces of the image forming apparatus 1 and may be made of resin. The exterior surfaces include an upper surface 6A of the housing cover 6.

Figure 3:
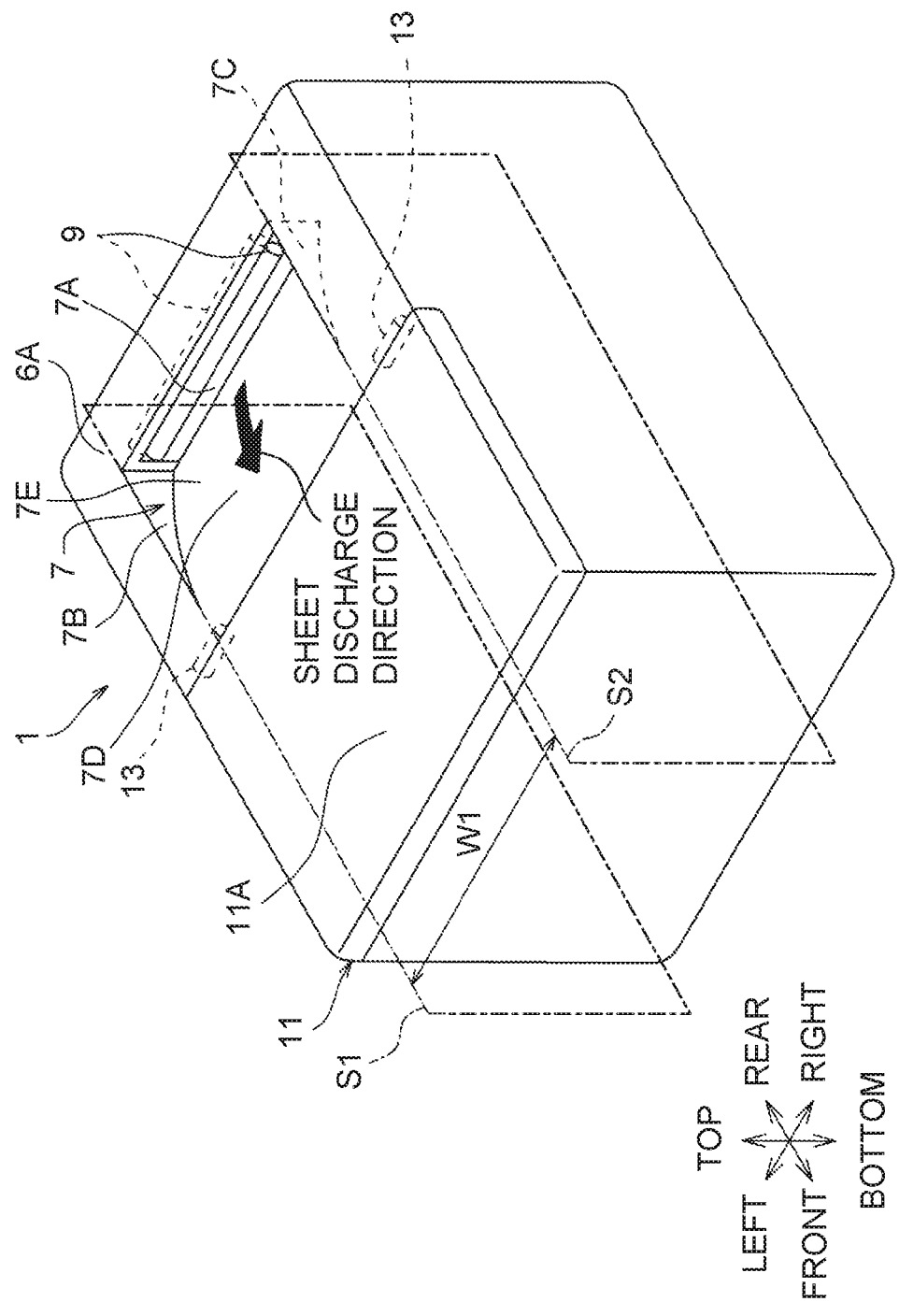
FIG. 3 is a perspective view of the external appearance of the image forming apparatus in the first illustrative embodiment according to one or more aspects of the disclosure.

As illustrated in FIG. 3, the image forming apparatus 1 includes a discharge portion 7. The discharge portion 7 is recessed downward relative to the upper surface 6A of the housing cover 6 in the vertical direction. A width direction of the image forming apparatus 1 may be orthogonal to both a sheet discharge direction and a sheet thickness direction. In the first illustrative embodiment, for example, the width direction corresponds to a right-left direction of the image forming apparatus 1.

A recording sheet on which an image has been formed is discharged to the discharge portion 7. The discharge portion 7 is configured to receive and support one or more discharged recording sheets each having an image formed on its surface. As illustrated in FIG. 4A, the discharge portion 7 has a discharge port 7A, a first wall 7B, a second wall 7C, and an inclined surface 7D, all of which are positioned lower than the upper surface 6A of the housing cover 6 in the vertical direction. The inclined surface 7D may be a receiving surface configured to receive and support one or more recording sheets discharged to the discharge portion 7.

The discharge port 7A may be an opening for discharging a recording sheet having an image formed on its surface toward the inclined surface 7D of the discharge portion 7. More specifically, the discharge port 7A may be elongated in the width direction and may be defined in an upstream end of the discharge portion 7 in the sheet discharge direction, e.g., in a rear end of the discharge portion 7.

The image forming apparatus 1 further includes at least one discharge roller 9. In this illustrative embodiment, a discharge roller pair 9 is disposed upstream from the discharge port 7A in a sheet conveyance direction. The discharge roller pair 9 is configured to apply a conveyance force to a recording sheet having an image on its surface to discharge the recording sheet toward the inclined surface 7D of the discharge portion 7.

Each of the discharge rollers 9 includes a shaft and a roller portion. The shaft extends in the width direction. The roller portion is supported by the shaft and may contact a recording sheet. As illustrated in FIG. 3, the first wall 7B and the second wall 7C face each other and are spaced from each other in the width direction.

A distance between the first wall 7B and the second wall 7C is substantially equal to or greater than a dimension (e.g., a width) of the discharge port 7A in the width direction. In the first illustrative embodiment, wall surfaces of the first wall 7B and the second wall 7C each extend perpendicular to the width direction.

In the discharge portion 7, the inclined surface 7D is positioned downstream from the discharge port 7A in the sheet discharge direction, e.g., further to the front than the discharge port 7A. As illustrated in FIG. 4A, the inclined surface 7D is inclined relative to the horizontal direction. More specifically, for example, while the inclined surface 7D is inclined relative to the horizontal direction, the inclined surface 7D extends toward an upper surface 11A of the document cover 11 such that a more downstream portion, e.g., a more front portion, of the inclined surface 7D in the sheet discharge direction is more closer to the upper surface 11A of the document cover 11.

The inclined surface 7D may be a portion of a discharge cover 7E. That is, an upper surface of the discharge cover 7E in the vertical direction includes the inclined surface 7D. As illustrated in FIG. 4B, the inclined surface 7D, i.e., the discharge cover 7E, has a lower end and an upper end in the vertical direction (e.g., an upstream end and a downstream end in the sheet discharge direction). The discharge cover 7E is pivotably attached to an apparatus body of the image forming apparatus 1 at its lower end via a second hinge 7F. The upper end of the discharge cover 7E is situated in the vicinity of an upstream end of the document cover 11 in the sheet discharge direction.

The apparatus body may be a portion (e.g., the housing cover 6 and a frame (not illustrated)) of the image forming apparatus 1. The apparatus body is not disassembled or removed from the image forming apparatus 1 in a normal use. The second hinge 7F is connected to, for example, a member including the upper surface 6A of the housing cover 6.

As illustrated in FIG. 4A, the scanner 5 is positioned downstream from the discharge portion 7 in the sheet discharge direction, e.g., further to the front than the discharge portion 7. As illustrated in FIG. 2, the scanner 5 includes at least a document table 5A and an image capture device 5B.

The document table 5A has a document support surface (e.g., a platen) where a document sheet to be scanned may be supported or placed. The document support surface (e.g., the platen) may be a transparent plate member through which light may pass. The image capture device 5B is configured to scan a document sheet placed on the document table 5A, i.e., the document support surface (e.g., the platen).

More specifically, the image capture device 5B is configured to receive light reflected off the document by light emission and output an electric signal based on the received light. In the first illustrative embodiment, the image capture device 5B may be a contact image sensor ("CIS"). The CIS (i.e., the image capture device 5B) is disposed directly below the document support surface, and is elongated in a direction orthogonal to its moving direction.

The direction in which the image capture device 5B is elongated may be referred to as a main scanning direction, and the direction in which the image capture device 5B moves may be referred to as a sub scanning direction. In the first illustrative embodiment, the main scanning direction corresponds to the sheet discharge direction, e.g., a front-rear direction. The sub scanning direction corresponds to the width direction. Accordingly, the sub scanning direction is orthogonal to the sheet discharge direction.

As illustrated in FIG. 1, the document cover 11 is positioned downstream from the first wall 7B and the second wall 7C in the sheet discharge direction, e.g., further to the front than the inclined surface 7D. The document cover 11 is configured to pivot between a first position at which the document cover 11 covers the document table 5A from above (refer to FIG. 4A) in the vertical direction and a second position that is a different position from the first position (refer to FIG. 4B).

More specifically, as illustrated in FIG. 3, the document cover 11 is pivotably attached to the apparatus body via at least one first hinge 13. In this illustrative embodiment, a plurality of, for example, two, first hinges 13 are disposed on opposite sides of the inclined surface 7D in the width direction. The first hinges 13 are positioned close to the upper end of the inclined surface 7D in the vertical direction.

When the document cover 11 is located at the first position, the upper surface 11A of the document cover 11 in the vertical direction is configured to support one or more recording sheets discharged onto the discharge portion 7. As illustrated in FIG. 4A, when the document cover 11 is located at the first position, the upper surface 11A is situated above the discharge roller pair 9 in the vertical direction.

The upper surface 11A being situated above the discharge roller pair 9 in the vertical direction may include, for example, the upper surface 11A being situated above a level at which the discharge roller pair 9 may contact or pinch a recording sheet. In the first illustrative embodiment, the upper end (e.g., the downstream end in the sheet discharge direction) of the inclined surface 7D is substantially level with the upper surface 11A in the vertical direction.

As illustrated in FIG. 3, a portion of the upper surface 11A of the document cover 11 in the vertical direction between a first imaginary plane S1 and a second imaginary plane S2 is defined as an area W1. When the document cover 11 is located at the first position, at least the area W1 extends flat in the horizontal direction.

Therefore, when the document cover 11 is located at the first position, i.e., when the document cover 11 covers the document table 5A, at least the area W1 of the upper surface 11A of the document cover 11 in the vertical direction functions as a discharge tray for supporting one or more recording sheets discharged onto the discharge portion 7 in cooperation with the discharge cover 7E.

The first imaginary plane S1 includes the first wall 7B. The second imaginary plane S2 includes the second wall 7C. That is, the first imaginary plane S1 and the second imaginary plane S2 are vertical imaginary planes that are situated on opposite sides of the inclined surface 7D (i.e., the discharge cover 7E) in the width direction.

Figure 5B:
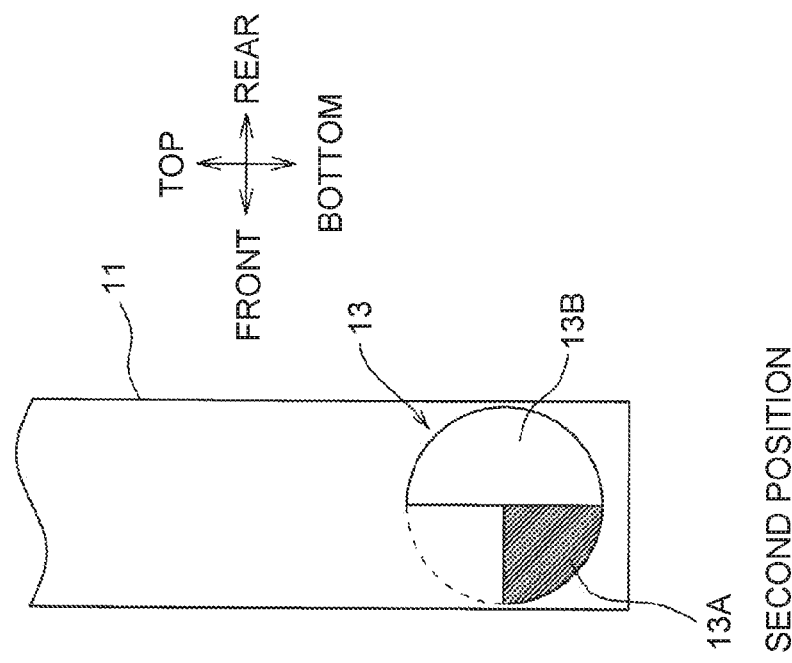
FIG. 5B illustrates the relative positional relationship between the restricting portion and its corresponding shaft portion when the document cover is located at the second position in the first illustrative embodiment according to one or more aspects of the disclosure.
Figure 5A:
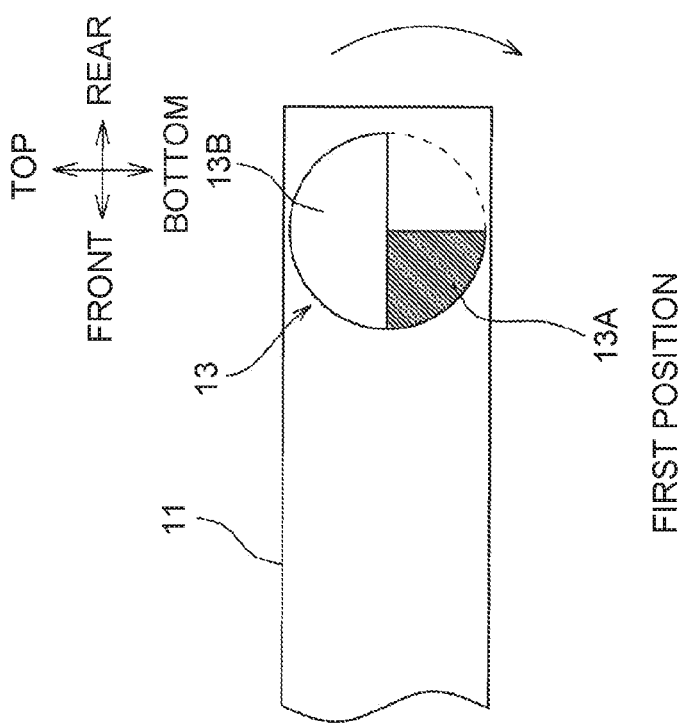
FIG. 5A illustrates a relative positional relationship between one of restricting portions and its corresponding shaft portion when the document cover is located at the first position in the first illustrative embodiment according to one or more aspects of the disclosure.

The image forming apparatus 1 further includes restricting portions 13A (one of which is illustrated in FIG. 5A). The restricting portions 13A are configured to restrict an angle θ formed by the document cover 11 and the document table 5A (refer to FIG. 4B) to 90 degrees or smaller. Each of the first hinges 13 includes a shaft portion 13B that is configured to rotate together with the document cover 11. The shaft portion 13B has a partially missing circular shape (e.g., a semicircular shape) in section.

The restricting portions 13A are positioned at respective predetermined positions of the apparatus body so as to be capable of contacting the respective corresponding shaft portions 13B. As illustrated in FIG. 5B, when the document cover 11 is located at the second position and the angle θ is approximately 90 degrees, the shaft portions 13B contact the respective restricting portions 13A (only one of each is illustrated in FIG. 5B). This may therefore restrict further pivoting of the document cover 11 from the second position in a direction in which the document cover 11 moves from the first position toward the second position. FIG. 5A illustrates a positional relationship between one of the restricting portions 13A and a corresponding one of the shaft portions 13B when the document cover 11 is located at the first position.

2. Features of Image Forming Apparatus According to First Illustrative Embodiment In the first illustrative embodiment, the discharge portion 7 is recessed downward in the vertical direction, and the discharge portion 7 has the first wall 7B and the second wall 7C that define its respective ends in the width direction. With this configuration, when a discharged recording sheet is received by the discharge portion 7, an upstream end portion of the recording sheet enters the recess and stays deep in the discharge portion 7. Therefore, if the document cover 11 is pivoted upward by a user while the discharged recording sheet remains on the document cover 11, the upstream end portion of the recording sheet in the discharge direction may be supported by the first wall 7B and second wall 7C that define the respective ends of the discharge portion 7 in the width direction with staying deep in the discharge portion 7.

When the document cover 11 is located at the first position, the upper surface 11A of the document cover 11 is situated above the position where the discharge roller pair 9 contacts a recording sheet in the vertical direction. This may therefore tend to direct a discharged recording sheet to the upper surface 11A readily.

In the first illustrative embodiment, the discharge portion 7 includes the inclined surface 7D positioned downstream from the discharge port 7A in the sheet discharge direction. The inclined surface 7D is inclined relative to the horizontal direction and extends toward the upper surface 11A of the document cover 11 such that a more downstream portion of the inclined surface 7D in the sheet discharge direction is more closer to the upper surface 11A of the document cover 11. This configuration may therefore tend to direct a discharged recording sheet to the upper surface 11A reliably.

In the first illustrative embodiment, the upper surface 11A of the document cover 11 in the vertical direction may extend flat in the horizontal direction. The upper surface 11A of the document cover 11 in the vertical direction may therefore function as a portion of the discharge tray.

In the first illustrative embodiment, the sub scanning direction of the image capture device 5B is parallel to the width direction. This configuration may therefore limit the size increase of the image forming apparatus 1 in the sheet discharge direction, e.g., the front-rear direction. Generally, the flatbed scanner 5 has a greater dimension in the sub scanning direction than a dimension in the main scanning direction. Therefore, parallelizing the sub scanning direction to the width direction may limit the size increase of the image forming apparatus 1 in the front-rear direction.

In the first illustrative embodiment, the image forming apparatus 1 includes the restricting portions 13A, each of which is configured to, when the document cover 11 is located at the second position, restrict that the angle formed by the document cover 11 and the document table 5A becomes not greater than 90 degrees. This configuration may thus reduce or prevent an excess opening of the document cover 11. Therefore, a recording sheet may be discharged without any obstruction if the document cover 11 is located at the second position.

Second Illustrative Embodiment

Figure 6A:
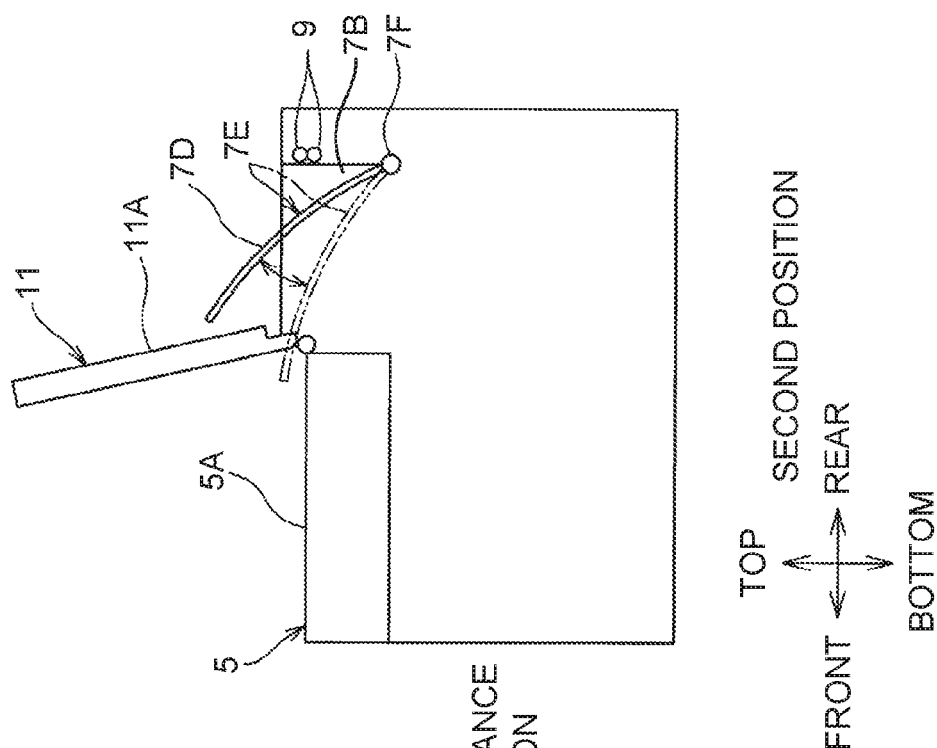
FIG. 6A is a sectional view of an image forming apparatus in a second illustrative embodiment according to one or more aspects of the disclosure, wherein a document cover is located at a first position.

In a second illustrative embodiment, as illustrated in FIG. 6A, a discharge cover 7E is configured to pivot in connection with pivoting of a document cover 11. An explanation will be given mainly for the components different from the first illustrative embodiment, and an explanation will be omitted for the common components by assigning the same reference numerals thereto.

Figure 6B:
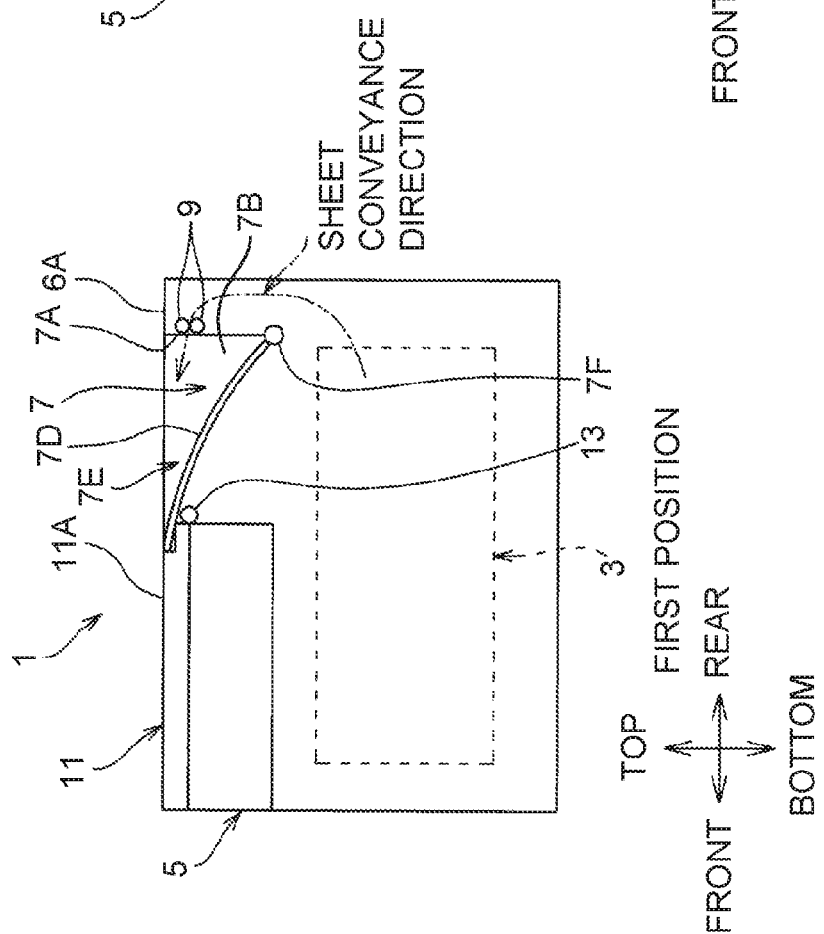
FIG. 6B is a sectional view of the image forming apparatus in the second illustrative embodiment according to one or more aspects of the disclosure, wherein the document cover is located at a second position.
Figure 8A:
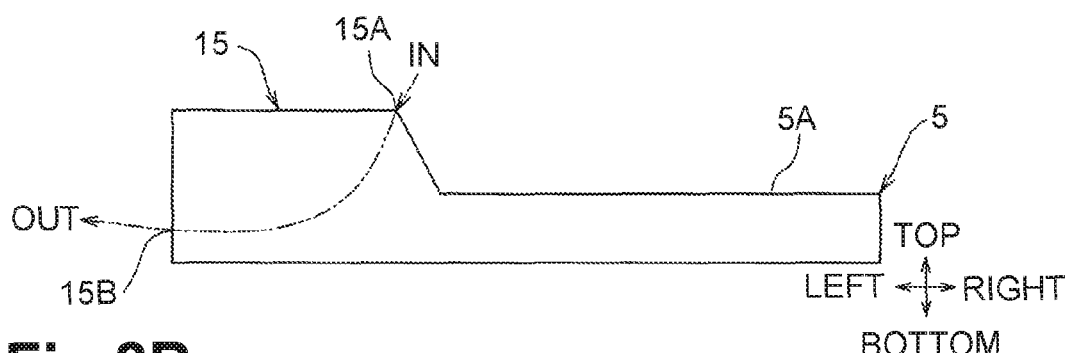
FIGS. 8A to 8D illustrate variations of an automatic document feeder in a fourth illustrative embodiment according to one or more aspects of the disclosure.
Figure 8B:
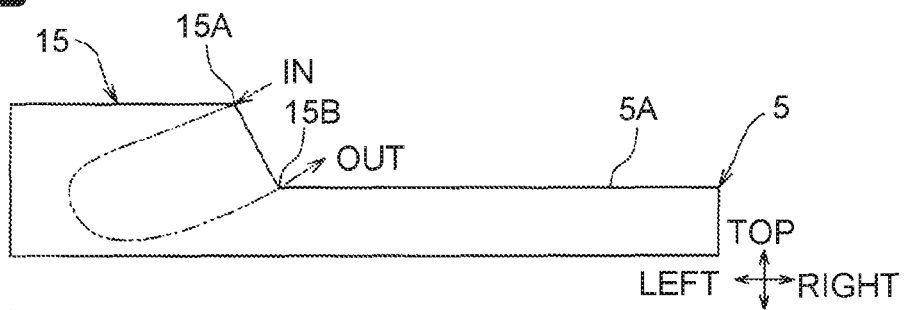
Figure 8C:
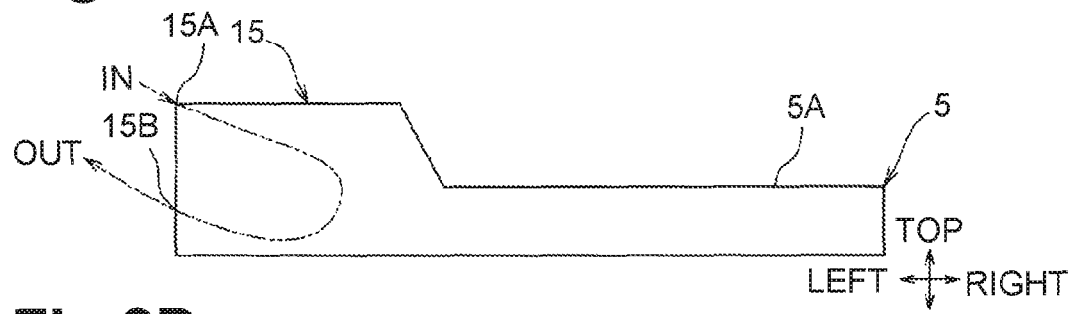
Figure 8D:
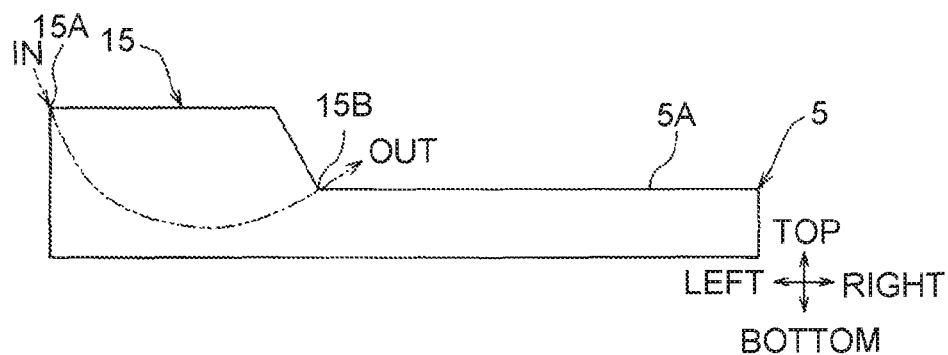

More specifically, for example, when the document cover 11 is located at the first position (refer to FIG. 6B), the discharge cover 7E extends to the document cover 11 beyond the first hinges 13 (only one of which is illustrated) and an upper end portion (e.g., a downstream end portion in the sheet discharge direction) of the discharge cover 7E contacts the upper surface 11A of the document cover 11. The upper end portion of the discharge cover 7E is slidable relative to the upper surface 11A.

With this configuration, when the document cover 11 is pivoted upward by the user, the upper surface 11A of the document cover 11 presses the upper end portion of the discharge cover 7E upward. In connection with the upward movement of the document cover 11, the discharge cover 7E pivots upward.

When the document cover 11 pivots from the second position toward the first position, the upward force is not acting on the upper end portion of the discharge cover 7E. Therefore, in connection with the pivoting of the document cover 11 toward the first position, the discharge cover 7E pivots downward by the force of gravity acting on the discharge cover 7E.

That is, the discharge cover 7E pivots downward in the vertical direction in connection with downward pivoting of the document cover 11. In the second illustrative embodiment, therefore, the discharge cover 7E may pivot in connection with pivoting of the document cover 11 in the above-described manner.

In the second illustrative embodiment, although the pivoting range of the document cover 11 is restricted by the restricting portions 13A, the user may pivot the discharge cover 7E further upwardly relative to the document cover 11 independently from the document cover 11. When the document cover 11 is located at the first position, the user may also pivot the discharge cover 7E upward independently from the document cover 11.

In the second illustrative embodiment (refer to FIG. 6A), the discharge cover 7E extends to the document cover 11 beyond the first hinges 13 and the upper end portion of the discharge cover 7E contacts the upper surface 11A of the document cover 11. The upper end portion of the discharge cover 7E is slidable relative to the upper surface 11A. This configuration may enable the discharge cover 7E to pivot in connection with the pivoting of the document cover 11. Nevertheless, in other embodiments, the synchronized pivoting of the discharge cover 7E with the pivoting of the document cover 11 may be implemented by another manner, for example, provision of a link mechanism.

Third Illustrative Embodiment

In a third illustrative embodiment, as illustrated in FIG. 7, an image forming apparatus further includes an automatic document feeder 15. The automatic document feeder 15 is configured to automatically convey a document sheet to be scanned, to the scanner 5, more specifically, to a position where the image capture device 5B is provided, and automatically discharge the scanned document sheet from the scanner 5.

The automatic document feeder 15 includes a document insertion portion 15A and a document discharge portion 15B. More specifically, for example, the document cover 11 has the document insertion portion 15A and the document discharge portion 15B, both of which are offset to one side (e.g., the left in FIG. 7) in the upper surface 11A in the width direction relative to the area W1 defined between the first imaginary plane S1 and the second imaginary plane S2. That is, both of the document insertion portion 15A and the document discharge portion 15B are disposed outside the area W.

The automatic document feeder 15 further includes an openable cover 15C. The openable cover 15C is configured to move between a third position at which the openable cover 15C covers the document insertion portion 15A and the document discharge portion 15B and a fourth position (refer to FIG. 7) that is different from the third position. The openable cover 15C has one end (e.g. a left end in FIG. 7) attached to one end portion of the document cover 11 in the width direction. The one end portion of the document cover 11 is positioned on the one side in the width direction. The openable cover 15C is pivotable between the third portion and the fourth position on its one end.

The openable cover 15C includes a document support portion 15D. When the openable cover 15C is located at the fourth position, the document support portion 15D may face upward in the vertical direction and support one or more document sheets. When the openable cover 15C is located at the third position, the document support portion 15D may face downward in the vertical direction and face the document insertion portion 15A and the document discharge portion 15B.

The automatic document feeder 15 is configured to successively separate a single document sheet from a plurality of document sheets placed on the document support portion 15D and convey the separated document sheet automatically. An explanation will be given mainly for the components different from the first illustrative embodiment, and an explanation will be omitted for the common components by assigning the same reference numerals thereto.

In the third illustrative embodiment, both of the document insertion portion 15A and the document discharge portion 15B are offset relative to the area W1 in the width direction. This configuration may therefore reduce or prevent interference between a recording sheet that has discharged onto the discharge portion 7 and a document sheet to be scanned.

In this illustrative embodiment, the openable cover 15C includes the document support portion 15D. Therefore, the openable cover 15C may function as a document tray for supporting one or more document sheets to be scanned and thus the automatic document feeder 15 may automatically feed the one or more document sheets one by one from the openable cover 15C.

Fourth Illustrative Embodiment

A fourth illustrative embodiment includes example variations of the third illustrative embodiment. An explanation will be given mainly for the components different from the first illustrative embodiment, and an explanation will be omitted for the common components by assigning the same reference numerals thereto.

As illustrated in FIGS. 8A, 8B, 8C, and 8D, the document insertion portion 15A and the document discharge portion 15B in each variation may be disposed at respective different positions from those according to the third illustrative embodiment. In FIGS. 8A, 8B, 8C, and 8D, the indication "IN" also refers to the document insertion portion 15A, and the indication "OUT" also refers to the document discharge portion 15B.

In the third and fourth illustrative embodiments, both of the document insertion portion 15A and the document discharge portion 15B are offset to the one side (e.g., the left) in the document cover 11 relative to the area W in the width direction, and disposed outside the area W1 in the width direction. Nevertheless, in other embodiments, for example, both of the document insertion portion 15A and the document discharge portion 15B may be offset to the other side (e.g., the right) in the document cover 11 relative to the area W in the width direction, and disposed outside the area W1 in the width direction.

Fifth Illustrative Embodiment

A fifth illustrative embodiment includes other example variations of the third illustrative embodiment. An explanation will be given mainly for the components different from the first illustrative embodiment, and an explanation will be omitted for the common components by assigning the same reference numerals thereto.

Figure 9A:
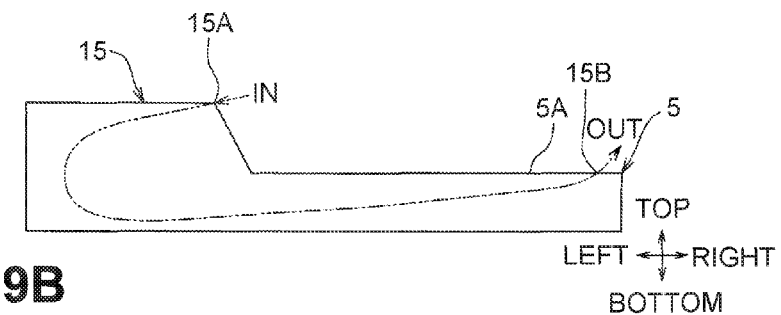
FIGS. 9A and 9B illustrate other variations of an automatic document feeder in a fifth illustrative embodiment according to one or more aspects of the disclosure.
Figure 9B:
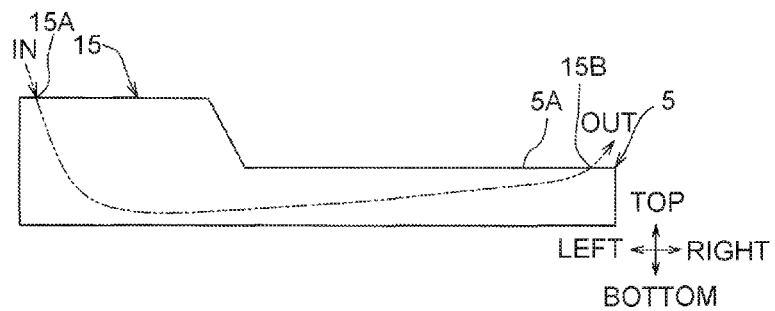

As illustrated in FIGS. 9A and 9B, the document insertion portion 15A and the document discharge portion 15B in each variation may be disposed at respective different positions from those according to the third illustrative embodiment. In FIGS. 9A and 9B, the indication "IN" also refers to the document insertion portion 15A, and the indication "OUT" also refers to the document discharge portion 15B.

As illustrated in FIGS. 9A and 9B, in a document cover 11 according to the fifth illustrative embodiment, the document insertion portion 15A is offset to one side (e.g., the left) relative to the area W1 in the width direction, and the document discharge portion 15B is offset to the other side (e.g., the right) relative to the area W1 in the width direction. Both of the document insertion portion 15A and the document discharge portion 15B are disposed outside the area W in the width direction.

Nevertheless, in other embodiments, for example, in the document cover 11, the document discharge portion 15B may be offset to the one side (e.g., the left) relative to the area W1 in the width direction, and the document insertion portion 15A may be offset to the other side (e.g., the right) relative to the area W1 in the width direction. In this case, also, both of the document insertion portion 15A and the document discharge portion 15B are disposed outside the area W in the width direction.

Other Alternative Embodiments

In the illustrative embodiments, the printer 3 is an electrophotographic printer. Nevertheless, in other embodiments, for example, the printer 3 may be an inkjet printer.

In the illustrative embodiments, when the document cover 11 is located at the first position, the upper surface 11A is situated above the discharge roller pair 9 in the vertical direction. Nevertheless, the positional relationship between the upper surface 11A and the discharge roller pair 9 is not limited to the specific example.

In the illustrative embodiments, at least the area W1 defined between the first imaginary plane S1 and the second imaginary plane S2, which is a portion of the upper surface 11A of the document cover 11, extends flat in the horizontal direction. Nevertheless, in other embodiments, for example, the area W may be an inclined surface that may be inclined downward toward the front, or the area W may have an uneven surface.

In the illustrative embodiments, the sub scanning direction of the image capture device 5B is parallel to the width direction. Nevertheless, in other embodiments, the sub scanning direction of the image capture device 5B may extend in any direction.

What is claimed is:

1. An image forming apparatus comprising:
    an apparatus body including a housing cover constituting exterior surfaces;
    a printer enclosed with the housing cover and configured to form an image onto a recording sheet;
    a discharge roller configured to discharge, in a sheet discharge direction, the recording sheet on which an image has been formed;
    a discharge portion including:
        a first wall and a second wall spaced from each other in a width direction orthogonal to both the sheet discharge direction and a vertical direction; and
        a receiving surface connecting lower ends, in the vertical direction, of the first wall and the second wall, the receiving surface being recessed relative to an upper surface of the housing cover and configured to receive the recording sheet discharged by the discharge roller, the receiving surface having an upstream end and a downstream end in the sheet discharge direction;
    a scanner disposed downstream from the discharge portion in the sheet discharge direction, the scanner including a document table and an image sensor; and
    a document cover disposed downstream from the first wall and the second wall of the discharge portion in the sheet discharge direction, the document cover being configured to pivot between a first position at which the document cover covers the document table of the scanner from above in the vertical direction and a second position that is different from the first position,
    wherein, when the document cover is located at the first position, an upper surface of the document cover is substantially level with the downstream end of the receiving surface of the discharge portion in the vertical direction.

2. The image forming apparatus according to claim 1, wherein, when the document cover is located at the first position, the upper surface of the document cover is configured to support the recording sheet discharged to the discharge portion.

3. The image forming apparatus according to claim 1, wherein, when the document cover is located at the first position, the upper surface of the document cover in the vertical direction is situated above the discharge roller in the vertical direction.

4. The image forming apparatus according to claim 1, wherein the receiving surface of the discharge portion is inclined relative to the horizontal direction and extends toward the upper surface of the document cover such that a more downstream portion of the receiving surface is more closer to the upper surface of the document cover in the vertical direction.

5. The image forming apparatus according to claim 1, wherein the downstream end of the receiving surface of the discharge portion is above the upstream end of the receiving surface in the vertical direction.

6. The image forming apparatus according to claim 5, further comprising:
   a first hinge disposed closer to the downstream end of the receiving surface of the discharge portion than to the upstream end of the receiving surface, the first hinge connecting the document cover to the apparatus body pivotably;
   a discharge cover having an upper surface in the vertical direction, the upper surface including the receiving surface of the discharge portion; and
   a second hinge disposed closer to the upstream end of the receiving surface than to the downstream end of the receiving surface, the second hinge connecting the discharge cover to the apparatus body pivotably,
   wherein the discharge cover is configured to pivot in connection with pivoting of the document cover.

7. The image forming apparatus according to claim 6, wherein the discharge cover extends to an upstream end portion of the document cover beyond the first hinge in the sheet discharge direction.

8. The image forming apparatus according to claim 1, wherein the upper surface of the document cover in the vertical direction has at least an area defined between a first imaginary plane including the first wall of the discharge portion and a second imaginary plane including the second wall of the discharge portion, the area extending flat in the horizontal direction.

9. The image forming apparatus according to claim 1, wherein a sub scanning direction of the image sensor is parallel to the width direction.

10. The image forming apparatus according to claim 1, further comprising an automatic document feeder configured to automatically convey a document sheet to the scanner,
    wherein the upper surface of the document cover in the vertical direction has at least an area defined between a first imaginary plane including the first wall of the discharge portion and a second imaginary plane including the second wall of the discharge portion, and
    wherein the automatic document feeder includes a document insertion portion that is offset to one side relative to the area in the width direction in the document cover and is disposed outside the area in the width direction.

11. The image forming apparatus according to claim 10, further comprising an openable cover configured to pivot between a third position at which the openable cover covers the document insertion portion and a fourth position that is different from the third position,
    wherein the openable cover includes a document support portion configured to, when the openable cover is located at the fourth position, support the document sheet.

12. The image forming apparatus according to claim 10, wherein the automatic document feeder further includes a document discharge portion that is offset to the one side relative to the area in the width direction in the document cover and is disposed outside the area in the width direction.

13. The image forming apparatus according to claim 10, wherein the automatic document feeder further includes a document discharge portion that is offset to an other side relative to the area in the width direction in the document cover and is disposed outside the area in the width direction, the other side being opposite to the one side relative to the area in the width direction.

14. The image forming apparatus according to claim 1, further comprising a hinge pivotably connecting the document cover to the apparatus body,
    wherein the hinge is disposed close to the downstream end of the receiving surface of the discharge portion.

15. The image forming apparatus according to claim 14, further comprising a restricting portion configured to, when the document cover is located at the second position, restrict an angle formed by the document cover and the document table to 90 degrees or less,
    wherein the restricting portion is disposed at the hinge.

* * * * *